(12) United States Patent
Ameser et al.

(10) Patent No.: US 11,493,161 B2
(45) Date of Patent: Nov. 8, 2022

(54) DUAL-FUEL MULTI-PORT CONNECTOR

(71) Applicant: Parker-Hannifin Corporation, Cleveland, OH (US)

(72) Inventors: Anna Ameser, Columbus, OH (US); Theodore Amling, Columbus, OH (US); Peter Schupska, Cleveland Heights, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 307 days.

(21) Appl. No.: 16/605,896

(22) PCT Filed: Apr. 30, 2018

(86) PCT No.: PCT/US2018/030113
§ 371 (c)(1),
(2) Date: Oct. 17, 2019

(87) PCT Pub. No.: WO2019/018043
PCT Pub. Date: Jan. 24, 2019

(65) Prior Publication Data
US 2020/0124285 A1    Apr. 23, 2020

Related U.S. Application Data

(60) Provisional application No. 62/534,282, filed on Jul. 19, 2017.

(51) Int. Cl.
*F16L 39/00* (2006.01)
(52) U.S. Cl.
CPC .................................. *F16L 39/00* (2013.01)
(58) Field of Classification Search
CPC ......... F16L 39/00; F16L 23/02; F16L 41/001; F23R 3/46; F23R 3/28; F02C 7/222
See application file for complete search history.

(56) References Cited

U.S. PATENT DOCUMENTS 2,447,185 A * 8/1948 Keim ...................... F16L 39/02
285/13
3,469,863 A * 9/1969 Riester .................... F16L 37/56
285/124.4

(Continued)

FOREIGN PATENT DOCUMENTS

CN           101182824        5/2008
EP           0 168 333        1/1986

(Continued)

OTHER PUBLICATIONS

International Search Report and Written Opinion prepared by the European Patent Office in International Application No. PCT/US2018/030113 dated Aug. 14, 2018.

(Continued)

*Primary Examiner* — Matthew Troutman
*Assistant Examiner* — Alexander T Rufrano
(74) *Attorney, Agent, or Firm* — McDonnell Boehnen Hulbert & Berghoff LLP

(57) ABSTRACT

An example connector includes: a block having a plurality of through-holes; a clamp plate having a plurality of through-holes aligned with the plurality of through-holes of the block; and a plurality of fittings, each fitting having a first end inserted through a respective through-hole in the clamp plate to be received within a corresponding through-hole in the block. Each fitting has a second end opposite the first end and configured to couple to a tube. Each fitting has grooves for mounting a radial seal and a retaining ring. The retaining ring is disposed between the clamp plate and the block.

6 Claims, 9 Drawing Sheets

(56) References Cited

U.S. PATENT DOCUMENTS

| | | | | |
|---|---|---|---|---|
| 3,869,153 A * | 3/1975 | De Vincent | | F16L 39/00 285/136.1 |
| 4,008,039 A * | 2/1977 | Compton | | F23D 11/06 431/90 |
| 4,089,549 A * | 5/1978 | Vyse | | F16L 37/56 285/308 |
| 4,171,559 A * | 10/1979 | Vyse | | F16L 39/02 29/469 |
| 4,468,054 A * | 8/1984 | Orth | | F25B 41/335 285/124.3 |
| 4,544,185 A * | 10/1985 | Weirich | | F16L 39/02 285/387 |
| 4,630,847 A * | 12/1986 | Blenkush | | F16L 37/56 285/242 |
| 4,804,208 A | 2/1989 | Dye | | |
| 4,889,369 A * | 12/1989 | Albrecht | | F16L 23/02 285/368 |
| 5,018,546 A | 5/1991 | Carmack et al. | | |
| 5,219,185 A | 6/1993 | Oddenino | | |
| 5,261,608 A | 11/1993 | Hatzis et al. | | |
| 5,342,097 A * | 8/1994 | Hanson | | A61C 19/00 285/124.1 |
| 6,189,333 B1 * | 2/2001 | Cummings | | F16L 39/00 62/474 |
| 6,896,298 B2 * | 5/2005 | Walterscheid | | F28F 9/0248 285/205 |
| 7,073,825 B2 | 7/2006 | Takada et al. | | |
| 7,703,812 B2 | 4/2010 | Asam et al. | | |
| 7,717,471 B2 | 5/2010 | Langenfeld et al. | | |
| 7,971,910 B2 * | 7/2011 | Holt | | F16L 41/086 285/13 |
| 8,262,136 B2 | 9/2012 | Lundgren | | |
| 8,424,920 B2 | 4/2013 | Gilbreath et al. | | |
| 8,585,098 B2 | 11/2013 | Lundgren | | |
| 8,991,872 B2 * | 3/2015 | Mahrenholz | | F16L 39/00 285/19 |
| 9,765,971 B2 * | 9/2017 | Matsubara | | F23R 3/286 |
| 9,874,351 B2 * | 1/2018 | Wolfe | | F02C 7/222 |
| 9,933,162 B2 * | 4/2018 | Inoue | | F23R 3/286 |
| 2002/0070546 A1 | 6/2002 | Johll et al. | | |
| 2006/0131874 A1 | 6/2006 | Frank et al. | | |
| 2006/0261560 A1 * | 11/2006 | Radliff | | F16L 5/08 277/345 |
| 2009/0232585 A1 | 9/2009 | Gilbreath et al. | | |
| 2013/0097991 A1 | 4/2013 | Zhang et al. | | |
| 2013/0298569 A1 * | 11/2013 | Nilsson | | F02C 7/22 60/776 |
| 2014/0338341 A1 | 11/2014 | Abreu | | |
| 2017/0234219 A1 * | 8/2017 | Barve | | F02C 7/228 60/39.465 |

FOREIGN PATENT DOCUMENTS

| | | |
|---|---|---|
| GB | 1 216 767 | 12/1970 |
| JP | 19770129069 U | 4/1979 |
| JP | 2008133893 A | 6/2008 |
| WO | WO 2009/111081 | 9/2009 |

OTHER PUBLICATIONS

Communication pursuant to Article 94(3) EPC prepared by the European Patent Office in application No. EP 18 730 147.8 dated Apr. 16, 2021.

Notice of the Reason for Refusal issued by the Japanese Patent Office in application No. 2019-565537 dated May 17, 2022. English translation included.

* cited by examiner

DUAL-FUEL MULTI-PORT CONNECTOR

CROSS REFERENCE TO RELATED APPLICATION

The present application claims priority to U.S. Provisional Application No. 62/534,282, filed on Jul. 19, 2017, which is hereby incorporated by reference in its entirety.

BACKGROUND

In many applications, tubes or hoses are used to transfer different types of fluids from one location to another. In some applications, several tubes transfer fluids over relatively long distances, and due to the distance through which the fluids are transferred, several tubes could be used to form a single line. Compression fittings are used to connect the several tubes together and form the single line. Thus, a large number of fittings are used when several lines are disposed in parallel, each line having several tubes connected via respective fittings.

To perform periodic maintenance of equipment, fluid lines may be disassembled and reassembled again. Such disassembly and reassembly may involve disconnecting and reconnecting the fittings that couple tubes together. Repeated disconnection and connection of fittings may be time consuming, tedious, and may lack robustness or integrity of the seals used to prevent leakage around the fittings. As a result, cost of maintenance and the potential for leakages and downtime of the associated equipment may increase.

Therefore, it may be desirable to have connectors that facilitate disassembly and reassembly of various fluid lines while maintaining integrity of fittings.

SUMMARY

The present disclosure describes implementations that relate to a dual-fuel multi-port connector. In a first example implementation, the present disclosure describes a multi-port connector. The multi-port connector includes: (i) a block having a plurality of through-holes; (ii) a clamp plate having a plurality of through-holes corresponding to, and aligned with, the plurality of through-holes of the block; (iii) a plurality of fittings, each fitting having a first end inserted through a respective through-hole in the clamp plate to be received within a corresponding through-hole in the block, where each fitting has a second end opposite the first end and configured to couple to a tube, and where each fitting of the plurality of fittings has: (a) a first annular groove disposed on an exterior peripheral surface thereof and positioned within the corresponding through-hole in the block, and (b) a second annular groove disposed on the exterior peripheral surface and spaced axially apart from the first groove, where a radial seal is disposed in the first annular groove within the corresponding through-hole in the block, and where a retaining ring is disposed in the second annular groove, such that the retaining ring is disposed between the clamp plate and the block; and (iv) a plurality of fasteners configured to couple the clamp plate to the block.

In a second example implementation, the present disclosure describes an assembly. The assembly includes (i) a block having a first end face, a second end face opposite the first end face, and a plurality of through-holes extending between the first end face and the second end face; (ii) a first clamp plate and a second clamp plate, each clamp plate having a respective plurality of through-holes corresponding to, and aligned with, the plurality of through-holes of the block; (iii) a first set of fittings, each fitting of the first set of fittings having a first end inserted through a respective through-hole in the first clamp plate and the first end face to be received within a corresponding through-hole in the block; and (iv) a second set of fittings, each fitting of the second set of fittings having a respective first end inserted through a respective through-hole in the second clamp plate and the second end face to be received within the corresponding through-hole in the block, where each fitting of the first set of fittings and the second set of fittings has (a) a first annular groove disposed in an exterior peripheral surface thereof, and (b) and a second annular groove disposed on the exterior peripheral surface and spaced axially apart from the first annular groove, where a radial seal is disposed in the first annular groove within the corresponding through-hole in the block, and where a retaining ring is disposed in the second annular groove, such that the retaining ring is disposed between a respective clamp plate of the first or second clamp plate and a respective end face of the first or second end face of the block.

In a third example implementation, the present disclosure describes another assembly. The assembly includes: (i) a first clamp plate and a second clamp plate, the first clamp plate having a plurality of through-holes corresponding to, and aligned with, a respective plurality of through-holes disposed in the second clamp plate; (ii) a first set of fittings, each fitting of the first set of fittings having a male end portion and a female end portion, where the female end portion is configured to receive a tube therein; (iii) a second set of fittings, each fitting of the second set of fittings having a first female end portion and a second female end portion, where the first female end portion is configured to receive a respective tube therein, and where the second female end portion is configured to receive the male end portion of a corresponding fitting of the first set of fittings; (iv) a plurality of radial seals, each radial seal being disposed in an annular groove in an exterior peripheral surface of a respective male end portion of a respective fitting of the first set of fittings, such that each radial seal is disposed within the second female portion of a respective fitting of the second set of fittings when coupled; and (v) a plurality of retaining rings, each retaining ring being disposed partially within a first annular groove in an exterior peripheral surface of a fitting of the first or second set of fittings and partially within a second annular groove disposed in an outer peripheral surface defining a respective through-hole in the first or second clamp plate.

In a fourth example implementation, the present disclosure describes a system. The system includes: at least one generally arcuate housing a plurality of tubes; and a plurality of multi-port connectors disposed in the at least one channel. Each multi-port connector of the plurality of multi-port connectors includes: (i) a block having a plurality of through-holes; (ii) a clamp plate having a plurality of through-holes corresponding to, and aligned with, the plurality of through-holes of the block; (iii) a plurality of fittings, each fitting having a first end inserted through a respective through-hole in the clamp plate to be received within a corresponding through-hole in the block, where each fitting has a second end opposite the first end and configured to couple to a tube of the plurality of tubes in the at least one channel, and where each fitting of the plurality of fittings has: (a) a first annular groove disposed on an exterior peripheral surface thereof and positioned within the corresponding through-hole in the block, and (b) a second annular groove disposed on the exterior peripheral surface and spaced axially apart from the first groove, wherein a radial seal is disposed in the first annular groove within the corresponding through-hole in the block, and where a retaining ring is disposed in the second annular groove, such that the retaining ring is disposed between the clamp plate and the block; and (iv) a plurality of fasteners configured to couple the clamp plate to the block.

The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

Figure 1A:
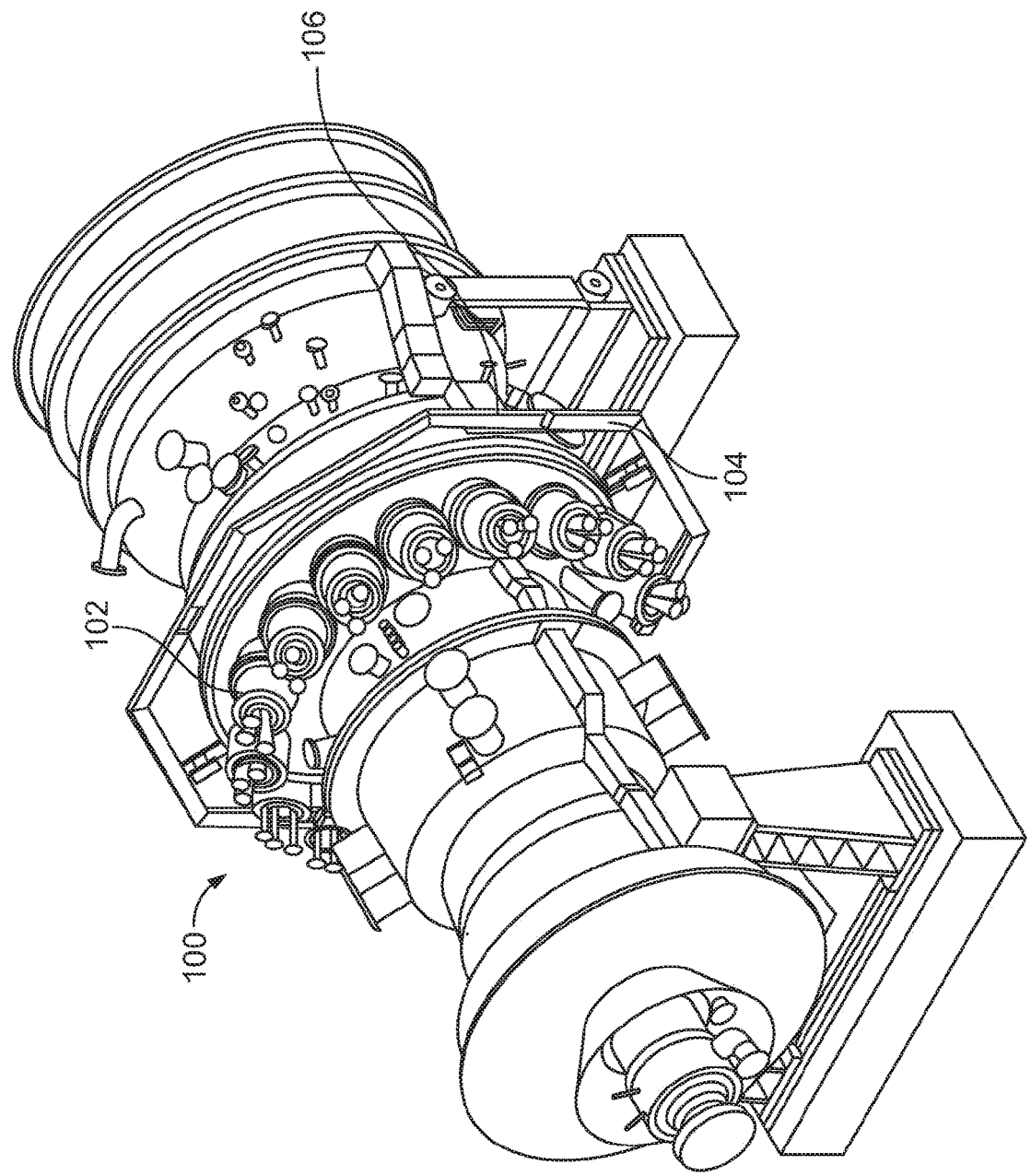
FIG. 1A illustrates a power generating device, in accordance with an example implementation.

FIG. 1A illustrates a power generating device 100, in accordance with an example implementation. The power generating device 100 may be configured as a turbine having a plurality of combustion canisters such as canister 102 that are disposed in a radial array about the power generating device 100. For instance, the plurality of canisters may be circumferentially spaced apart about a periphery of the power generating device 100.

Each canister is configured as a combustion chamber that is fed high pressure air by a compression system. The canister then heats the air at constant pressure, and after heating, air passes from the canister through nozzle guide vanes to the turbine. The canister is configured to mix and ignite air and fuel, and then mix in more air to complete the combustion process.

In examples, the power generating device 100 could, for example, be a dual-fuel turbine. A dual-fuel turbine may run primarily with natural gas as fuel. However, as a back-up fuel supply system in case natural gas is not available, the dual-fuel turbine may also be configured to receive liquid fuel and water through a pipe system. For instance, the power generating device 100 may have tracks or channels 104 and 106 disposed parallel to each other. In examples, the channels 104 and 106 could be generally arcuate. For instance, the channels 104 and 106 may encircle, at least partially, the power generating device 100.

Figure 1B:
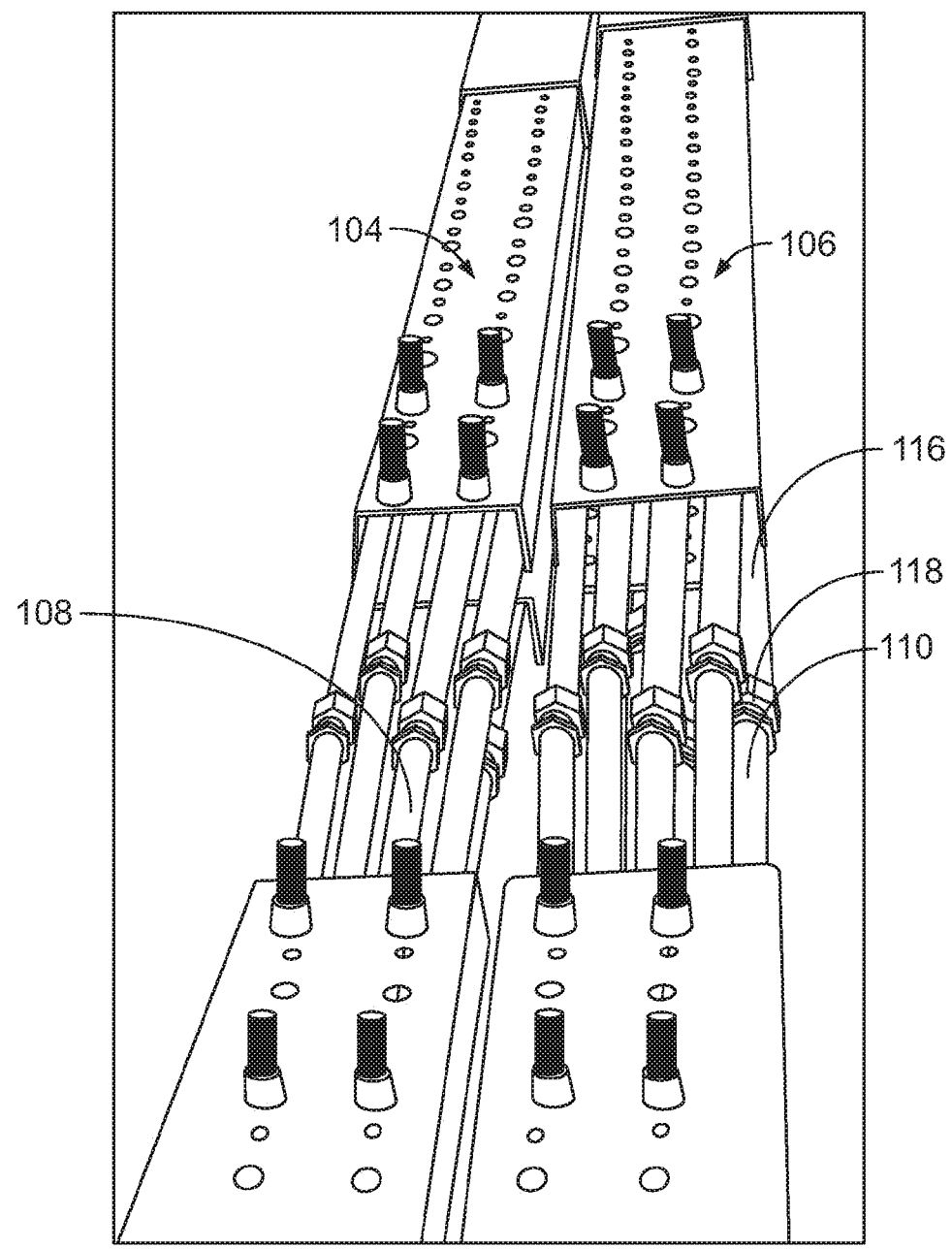
FIG. 1B illustrates a zoomed-in view of the power generating device of FIG. 1A showing a portion of channels, in accordance with an example implementation.

FIG. 1B illustrates a zoomed-in view of the power generating device 100 showing a portion of the channels 104, 106, in accordance with an example implementation. As shown in FIG. 1B, each of the channels 104, 106 may be configured to house a plurality of tubes, such as tube 108 within the channel 104 and tube 110 within the channel 106. The tubes within the channels 104, 106 are connected at one end to a skid that includes a fluid control system (e.g., valves, pumps, etc.) configured to provide fuel and water through the tubes to the canisters.

In an example, the tubes of the channel 104 may be connected to a source of water, whereas the tubes of the channel 106 may be connected to a source of liquid fuel. In another example, a tube within a channel (e.g., the channel 104 or 106) may be connected to the source of water while another tube within the same channel may be connected to the source of fuel.

Figure 1C:
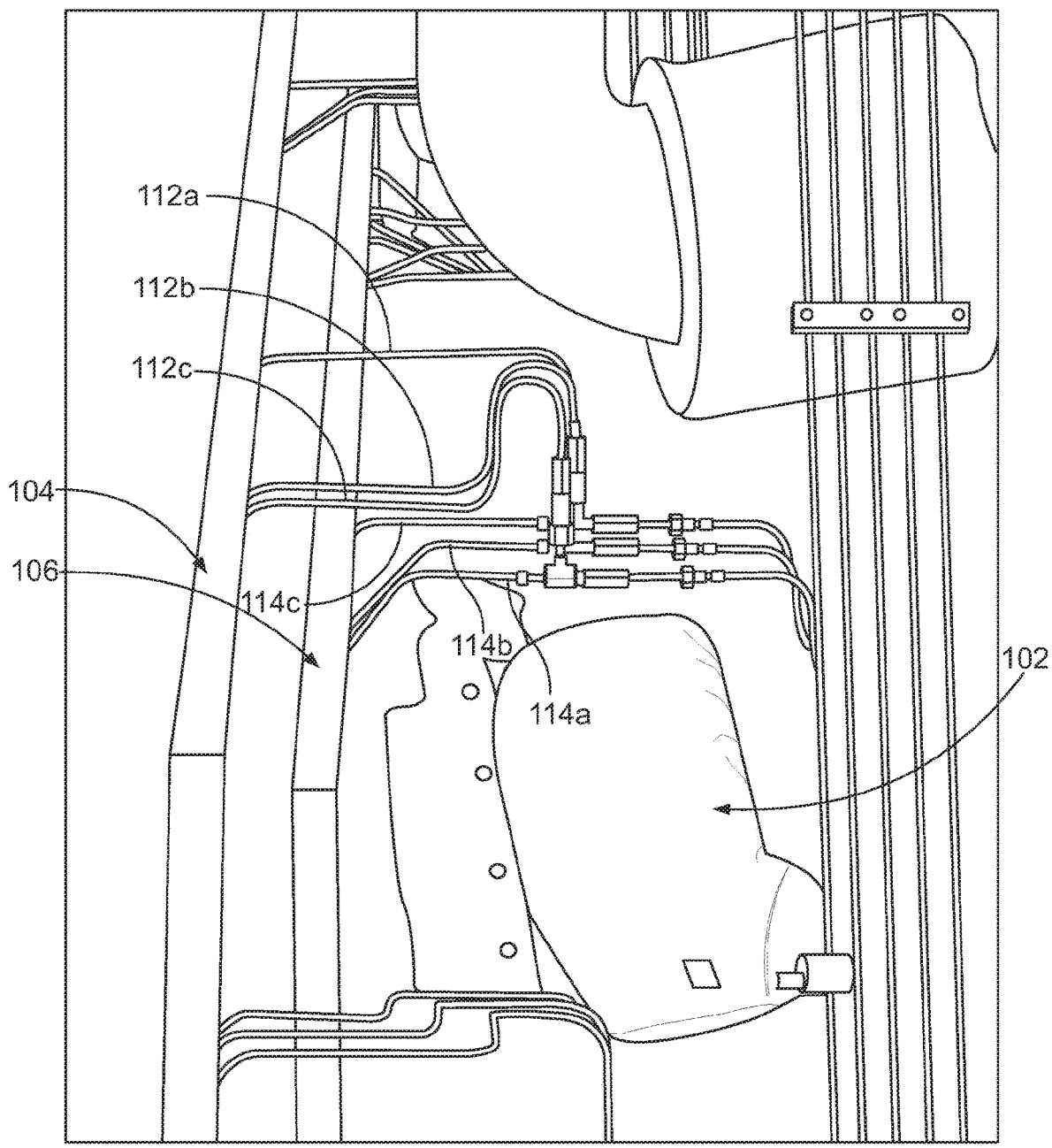
FIG. 1C illustrates another zoomed-in view of the power generating device of FIG. 1A showing connecting tubes within the channels to canisters, in accordance with an example implementation.

FIG. 1C illustrates another zoomed-in view of the power generating device 100 showing connecting the tubes within the channels 104, 106 to the canisters, in accordance with an example implementation. Each canister, e.g., the canister 102 may have three combustion stages, stage A, state B, and pilot stage. As such, three tubes may branch from each channel 104, 106 to deliver fuel and water to the canister 102. For instance, as shown in FIG. 1C, three tubes 112A, 112B, and 112C may be connected to respective tubes within the channel 104 and configured to deliver fuel or water to one of the combustion stages of the canister 102. Each of the tubes 112A-112C may have a check valve to prevent back flow toward the tubes in the channel 104.

Similarly, three tubes 114A, 114B, and 114C may be connected to respective tubes within the channel 106 and configured to deliver fuel or water to one of the combustion stages of the canister 102. Each of the tubes 114A-114C may have a check valve to prevent back flow toward the tubes in the channel 106. The tubes 112A-112C are then connected to the tubes 114A-114C to mix the water and fuel into an emulsion that is then burned in a respective combustion stage of the canister 102.

Referring back to FIG. 1B, each tube within a given channel 104, 106 may be segmented into multiple tube sections. In other words, multiple tubes may be connected together to form a long tube or line. The tube sections may be coupled to each other via compression fittings. For example, the tube 110 may be coupled to another tube 116 via a compression fitting 118.

The power generating device 100 may be subjected to periodic maintenance according to rules and guidelines of operating the power generating device 100. To perform such periodic maintenance, a top cover of the power generating device 100 may be removed to allow access to components underneath the top cover. To remove the top cover, the channels 104, 106 and the tubes disposed therein are disassembled and then reassembled upon finishing maintenance procedure to restore the power generating device 100 to an operating condition.

As an example for illustration, the power generating device 100 may include 48 fittings in the channels 104, 106 that are disassembled and reassembled for each maintenance event. Particularly, during each maintenance event, the fittings are disconnected and the tubes are pulled off the channels 104, 106. Disassembling that many fittings, resealing the fittings, and assembling the fittings with the tubes periodically may be challenging, and may cause wear and leakage over time. Further, the lines and tubes may be mangled over time. Thus, overtime maintaining the power generating device 100 may become costly and time consuming. Disclosed herein a dual-fuel multi-port connector that facilitates assembly and reassembly of the tubes in the channels 104, 106 to preclude mangling of the tubes, damage, and leakage.

Figure 2A:
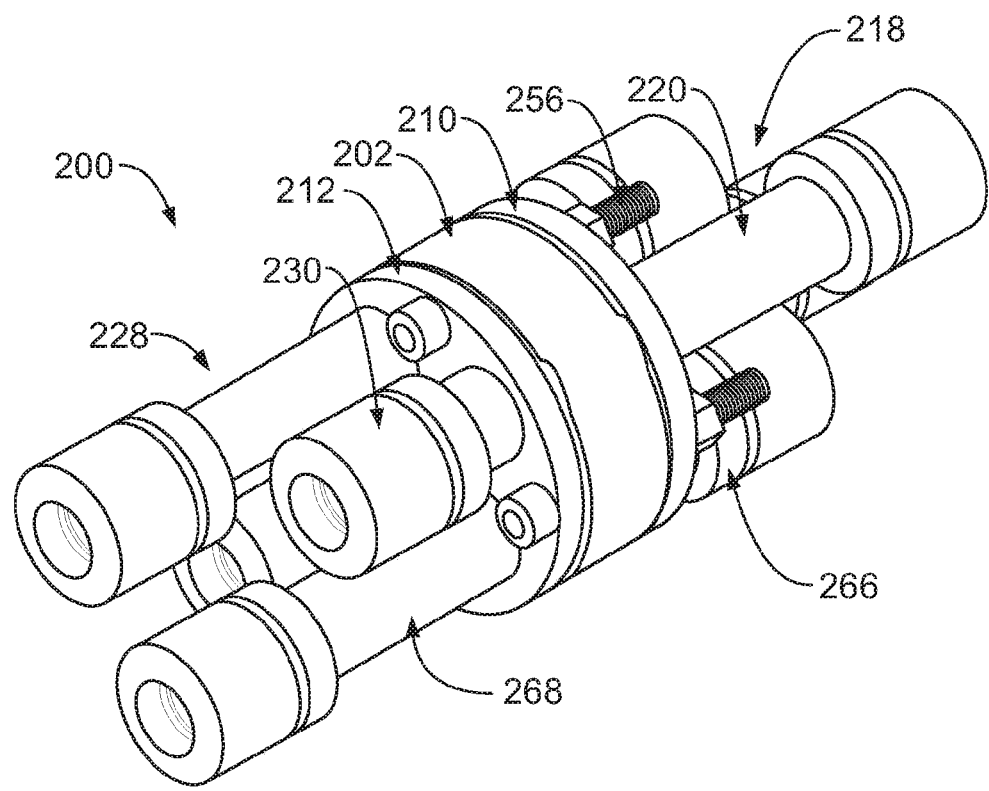
FIG. 2A illustrates a perspective view of a multi-port connector, in accordance with an example implementation.
Figure 2B:
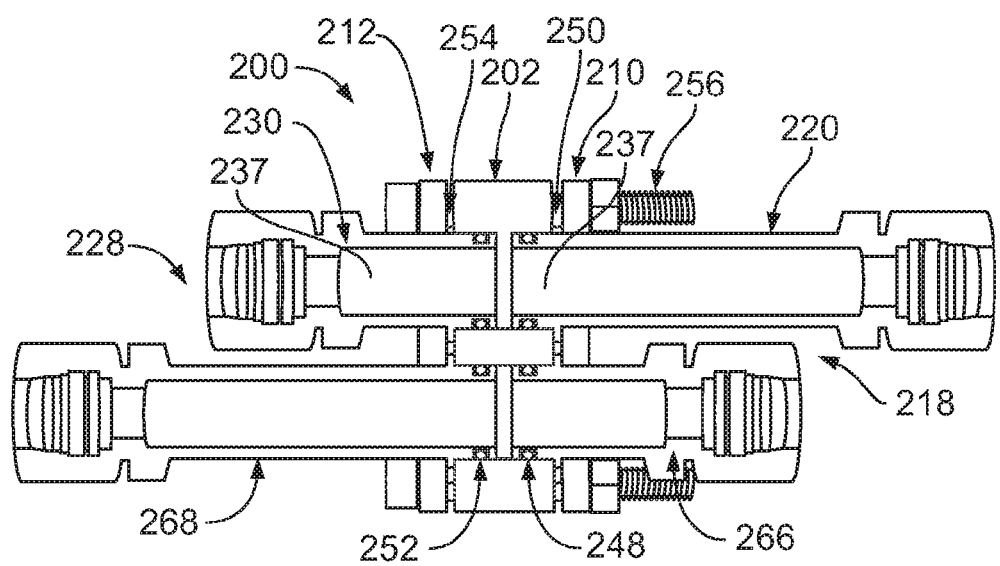
FIG. 2B illustrates a cross section of the multi-port connector of FIG. 2A, in accordance with an example implementation.
Figure 2C:
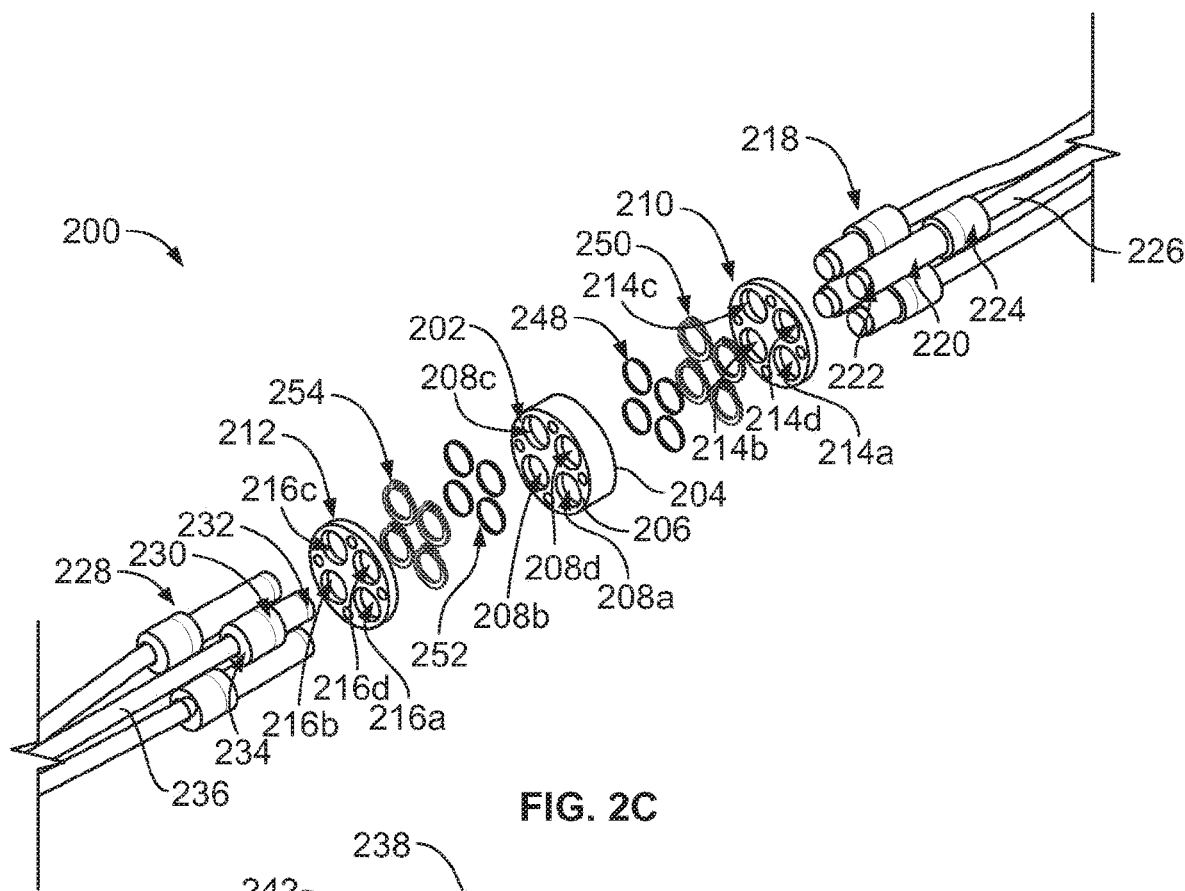
FIG. 2C illustrates an exploded view of the multi-port connector of FIG. 2A, in accordance with an example implementation.

FIG. 2A illustrates a perspective view of a multi-port connector 200, FIG. 2B illustrates a cross section of the multi-port connector 200, and FIG. 2C illustrates an exploded view of the multi-port connector 200, in accordance with an example implementation. FIGS. 2A, 2B, and 2C are described together.

Referring to the exploded view in FIG. 2C, the multi-port connector 200 includes a block 202 having a first end face 204 and a second end face 206 opposite the first end face 204. The block 202 has a plurality of through-holes 208A, 208B, 208C, and 208D extending between the first end face 204 and the second end face 206. Four through-holes are used herein as an example, and in other examples, the block 202 may have more or fewer through-holes.

The multi-port connector 200 also includes a first clamp plate 210 and a second clamp plate 212. Each of the clamp plates 210 and 212 has a respective plurality of through-holes corresponding to, and aligned with, the through-holes 208A-208C of the block 202. For example, the clamp plate 210 has through-holes 214A, 214B, 214C, and 214D that respectively correspond to and align with the through-holes 208A-208C of the block 202. Similarly, the clamp plate 212 has through-holes 216A, 216B, 216C, and 216D that respectively correspond to and align with the through-holes 208A-208C of the block 202.

In an example, as show in FIGS. 2A-2C, the block 202 as well as the clamp plates 210, 212 may be disk-shaped. In examples, the through-holes 208A-208C may be disposed in a radial array around a center of the block 202. Similarly, the through-holes 214A-214C may be disposed in a radial array around a center of the clamp plate 210, and the through-holes 216A-216C may be disposed in a radial array around a center of the clamp plate 212. However, other shapes and arrangements are possible.

The multi-port connector 200 also includes a first set of fittings 218. Each fitting of the first set of fittings 218 has a first end that is inserted through a respective through-hole in the clamp plate 210 and the first end face 204 of the block 202 to be received within a corresponding through-hole in the block 202. For instance, a fitting 220 of the first set of fitting 218 has a first end 222 that is inserted through the through-hole 214D of the clamp plate 210 and the first end face 204 to be received with the through-hole 208D of the block 202. Further, each fitting of the first set of fittings 218 has a second end opposite the first end and configured to couple to a tube. For example, the fitting 220 has a second end 224 that is configured to couple to a tube 226. The tubes, e.g., the tube 226, could be rigid tubes, flexible hoses, or any type of fluid transfer conduit. The fitting 220 could be coupled to the tube 226 in any type of configuration such as male-female configuration or via welding, as examples. Further, the tubes and the multi-port connector 200 could be used with any type of fluid (e.g., gas, liquid, hydraulic fluid, water, fuel, etc.).

The multi-port connector 200 also includes a second set of fittings 228. Each fitting of the second set of fittings 228 has a first end inserted through a respective through-hole in the clamp plate 212 and the second end face 206 of the block 202 to be received within the corresponding through-hole in the block 202. For instance, a fitting 230 of the second set of fitting 228 has a first end 232 that is inserted through the through-hole 216D of the clamp plate 212 and the second end face 206 to be received with the through-hole 208D of the block 202. Further, each fitting of the second set of fittings 228 has a second end opposite the first end and configured to couple to a respective tube. For example, the fitting 230 has a second end 234 that is configured to couple to a tube 236. The tubes, e.g., the tube 236, could be rigid tubes, flexible hoses, or any type of fluid transfer conduit. The fitting 230 could be coupled to the tube 236 in any type of configuration such as male-female configuration or via welding, as examples. Further, the tubes and the multi-port connector 200 could be used with any type of fluid (e.g., gas, liquid, hydraulic fluid, water, fuel, etc.).

As shown in FIG. 2B, first ends of the first set of fittings 218 interface with respective first ends of the second set of fittings 228 within the corresponding through-hole in the block 202, such that a fitting (e.g., the fitting 220) of the first set of fittings 218 and a mating fitting (e.g., the fitting 230) of the second set of fittings 228 form a fluid passageway 237 through the block 202.

Figure 2D:
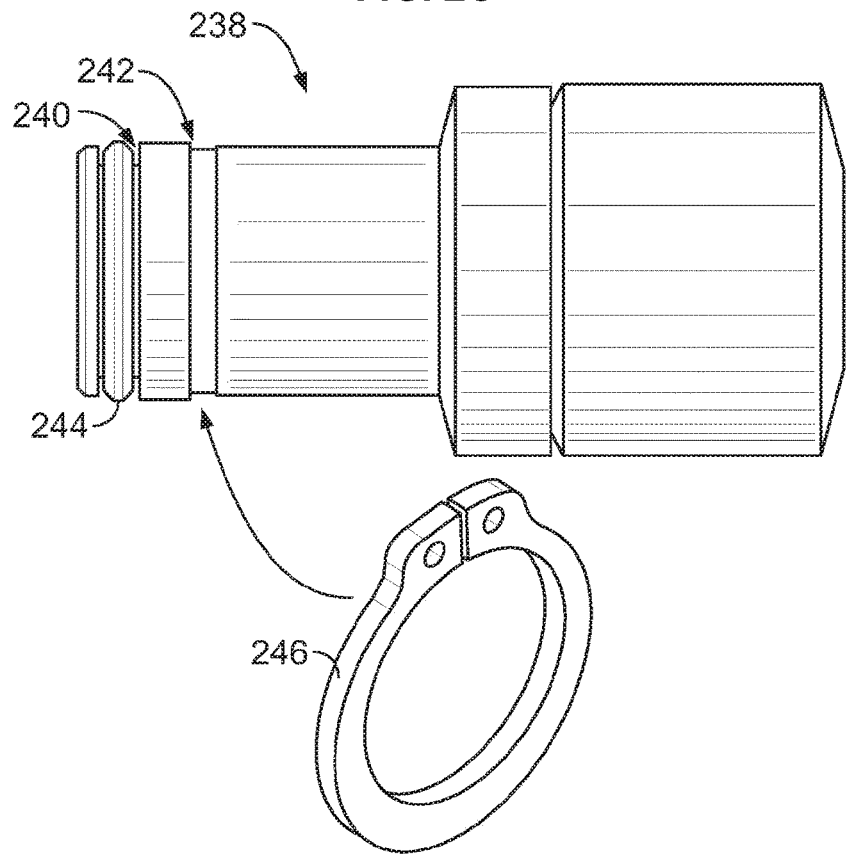
FIG. 2D illustrates a fitting, in accordance with an example implementation.

FIG. 2D illustrates a fitting 238, in accordance with an example implementation. The fitting 238 could represent any of the fittings of the first set of fittings 218 or the second set of fittings 228. The fitting 238 has a first annular groove 240 disposed in an exterior peripheral surface of the fitting 238. The fitting 238 also has a second annular groove 242 disposed on the exterior peripheral surface. The second annular groove 242 is spaced axially apart from the first annular groove 240. A radial seal 244 (e.g., an O-ring) is disposed in the first annular groove 240, and a retaining ring 246 is disposed in the second annular groove 242.

In examples, each fitting of the first set of fittings 218 and the second set of fittings 228 is configured similar to the fitting 238, and as such each fitting has two annular grooves, one for a radial seal and another for a retaining ring. Thus, referring to FIGS. 2B-2C, the multi-port connector 200 has a first set of radial seals 248 and a first set of retaining rings 250 associated with the first set of fittings 218. Additionally, the multi-port connector 200 has a second set of radial seals 252 and a second set of retaining rings 254 associated with the second set of fittings 228.

The multi-port connector 200 is assembled via a plurality of fasteners, such as fastener 256 shown in FIGS. 2A-2B, passing through respective holes in the block 202 and the clamp plates 210, 212. The plurality of fasteners is configured to couple the clamp plates 210, 212 to the block 202 as shown in FIGS. 2A-2B.

When the multi-port connector 200 is assembled as shown in FIG. 2B, the radial seals 248 and 252 are positioned within the corresponding through-hole in the block 202, whereas the retaining rings 250 and 254 are disposed between a respective clamp plate and the block 202. For instance, the retaining rings 250 are disposed or sandwiched between the clamp plate 210 and first end face 204 of the block 202, whereas the retaining rings 254 are disposed or sandwiched between the clamp plate 212 and the second end face 206 of the block 202.

With this configuration, the radial seals 248 and 252 seal the interface between the first and second sets of fittings 218 and 228 and the inner peripheral surface of each through-hole 208A-208D of the block 202 to preclude leakage from the fluid passageways (e.g., the fluid passageway 237). Further, with this configuration, the retaining rings 250 and 254 are configured to carry axial loads resulting from fluid pressure from fluid flow within the tubes and fluid passageways.

Figure 2E:
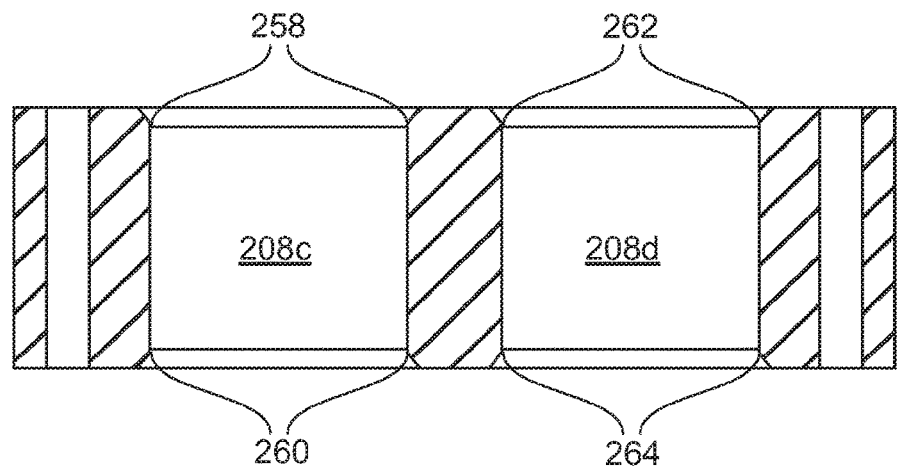
FIG. 2E illustrates a cross section of a block of the multi-port connector of FIG. 2A, in accordance with an example implementation.

FIG. 2E illustrates a cross section of the block 202, in accordance with an example implementation. Through-holes of the block 202 may have lead-in chamfers that facilitate insertion of the fittings 218 and 228, without damaging the radial seals 248 and 252 mounted thereto. For example, as depicted in FIG. 2E, the through-hole 208C has lead-in chamfers 258 at one end thereof and lead-in chamfers 260 at the other end. Similarly, the through-hole 208D has lead-in chamfers 262 at one end thereof and lead-in chamfers 264 at the other end.

Referring back to FIGS. 2A-2C, in an example implementation, the fittings of the first set of fittings 218 may have different axial lengths compared to mating fittings of the second set of fittings 228. For instance, the fitting 220 is longer than the mating fitting 230. Further, adjacent fittings of the first set of fittings 218 may have different axial lengths relative to each other, and adjacent fittings of the second set of fittings 228 may have different axial lengths relative to each other. For instance, as shown in FIG. 2B, the fitting 220 is longer than an adjacent fitting 266 of the first set of fittings 218, and the fitting 230 is shorter than an adjacent fitting 268 of the second set of fittings 228.

With this configuration, the first set of fittings 218 and the second set of fittings 228 are disposed in a staggered arrangement that reduces an overall radial signature (e.g., an overall radius and overall assembly size) of the multi-port connector 200. This way, multiple assemblies of the multi-port connector 200 could be disposed in the channels 104 and 106.

Figure 3:
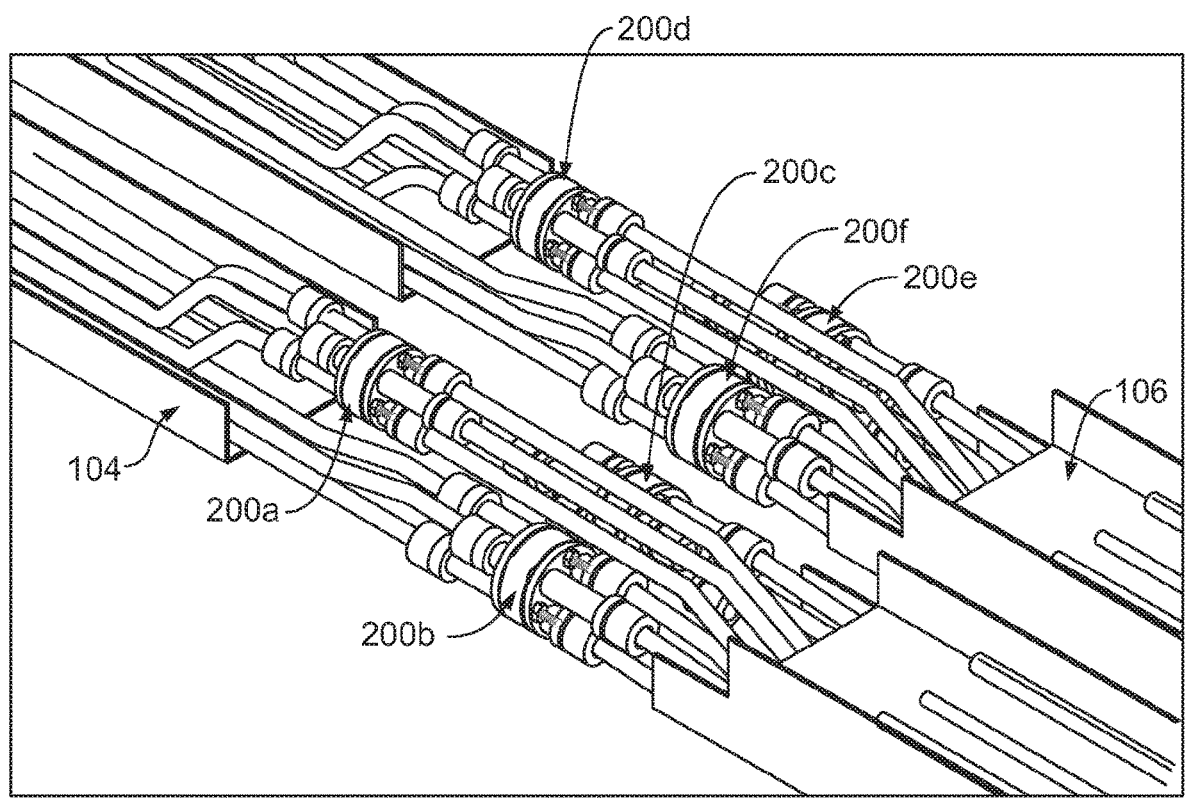
FIG. 3 illustrates a plurality of multi-port connectors disposed in channels, in accordance with an example implementation.

FIG. 3 illustrates a plurality of multi-port connectors 200A, 200B, 200C, 200D, 200E, and 200F disposed in the channels 104, 106, in accordance with an example implementation. Particularly, the channel 104 includes the three multi-port connectors 200A-200C, whereas the channel 106 includes the three multi-port connectors 200D-200F. The number of multi-port connectors illustrated in FIG. 3 is an example for illustration, and more or fewer multi-port connectors could be disposed within each channel.

As shown in FIG. 3, due to the reduced overall radial size of each multi-port connector, several multi-port connectors could fit within each channel 104, 106. Further, the multi-port connectors themselves may be disposed in a staggered arrangement such that they are axially shifted relative to each other. This configuration facilitates disposing a large number of tubes within the channels 104, 106 without enlarging the size of the channels 104, 106.

In examples, some (e.g., one) of the multi-port connectors may stick out of a respective channel. Also, the channels 104, 106 may be disposed on top of each other or side-by-side. The arrangements of the multi-port connectors facilitate such configurations while reducing the space that the channels 104, 106 and the components therein occupy.

Further, using the multi-port connectors 200A-200F facilitates assembly and disassembly of the channels 104, 106. As an example, sections of the channels 104, 106 may be pre-fabricated and sent to an assembly site of the power generating device 100 during commission thereof. Subsequently, during periodic maintenance events, the design of the multi-port connectors 200A-200F and their arrangement facilitates disassembly and reassembly.

Figure 4:
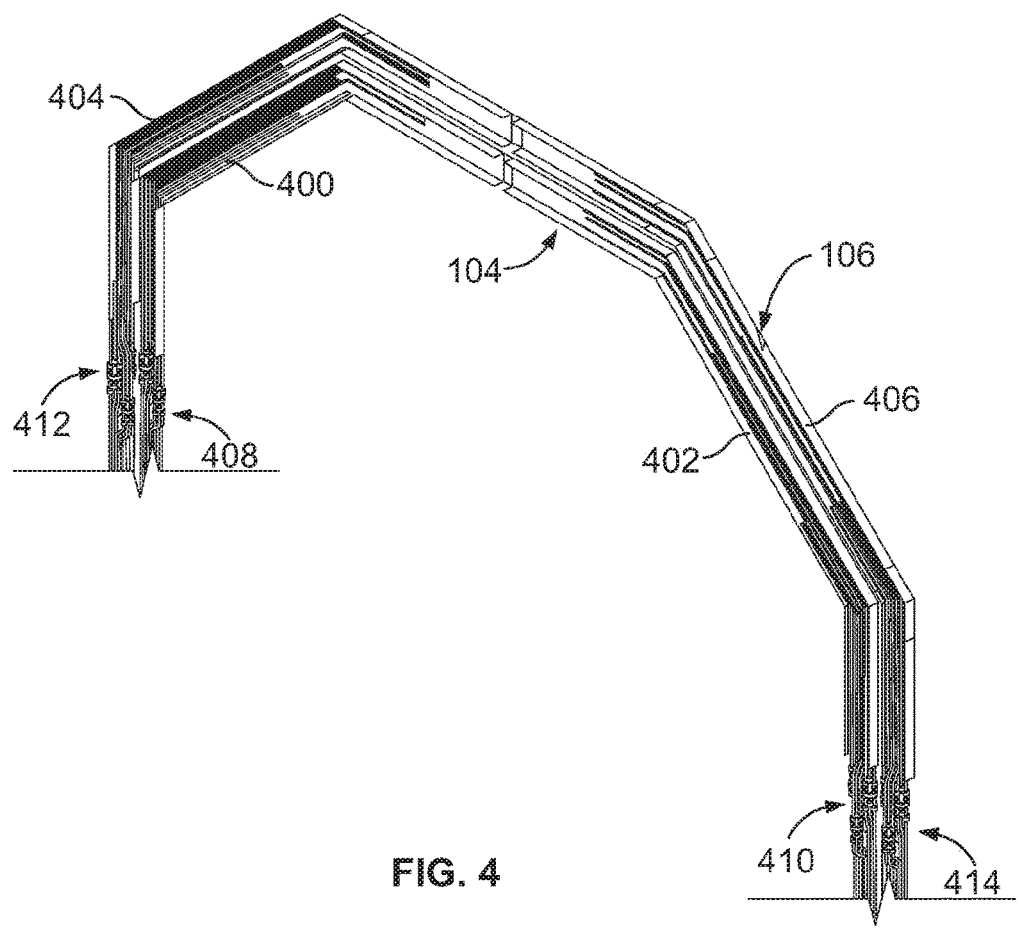
FIG. 4 illustrates dividing channels into sections to facilitate shipping, assembly, and reassembly, in accordance with an example implementation.

FIG. 4 illustrates dividing the channels 104, 106 into sections to facilitate shipping, assembly, and reassembly, in accordance with an example implementation. As an example, the channels 104, 106 may be divided into quarters. FIG. 4 shows two quarters 400 and 402 of the channel 104 and two quarters 404 and 406 of the channel 106.

Tubes may be disposed within each quarter of the channels 104, 106 and groups of multi-port connectors 200 may be pre-installed or preassembled to the tubes therein. For instance, the quarter 400 may have a group 408 of multi-port connectors 200, the quarter 402 may have a group 410 of multi-port connectors 200, the quarter 404 may have a group 412 of multi-port connectors 200, and the quarter 406 may have a group 414 of multi-port connectors 200.

The quarters 400-406 with their preassembled tubes and multi-port connectors 200 can be shipped to a commissioning site of the power generating device 100. Tubes within mating quarters may then be coupled to the multi-port connectors 200 shown in FIG. 4 to complete assembly of the channels 104, 106.

To perform any subsequent periodic maintenance where the channels 104, 106 are to be disassembled, the tubes coupled to the groups 408-414 of multi-port connectors 200 may be disconnected from the multi-port connectors 200 without disassembling the multi-port connectors 200 themselves. The channels 104, 106 could thus be divided again into quarters that could be removed to facilitate removal of the top cover of the power generating device 100 and perform maintenance. The quarters of the channels 104, 106 may be reassembled by connecting tubes to their respective multi-port connectors 200 upon completing the maintenance of the power generating device 100.

As such, the design and arrangement of the multi-port connector 200 facilitate assembly and reassembly of the channels 104, 106 and their components while reducing probability of failure. Particularly, disassembly and reassembly might not involve removing seals and resealing the fittings, and thus wear and leakage over time may be avoided. Further, the spatial arrangement of the multi-port connectors 200 and dividing the channels 104, 106 into mating sections (e.g., quarters) may facilitate reassembling the tubes to their proper multi-port connector 200 without mangling tubes over time. Thus, cost and time involved in maintaining the power generating device 100 may be reduced.

The configuration shown in FIGS. 2A-2E represents an example implementation of a multi-port connector, and several variations could be made to the design. For example, while FIGS. 2A-2E illustrate using radial seals 248, 252, face seals could be used instead.

Figure 5A:
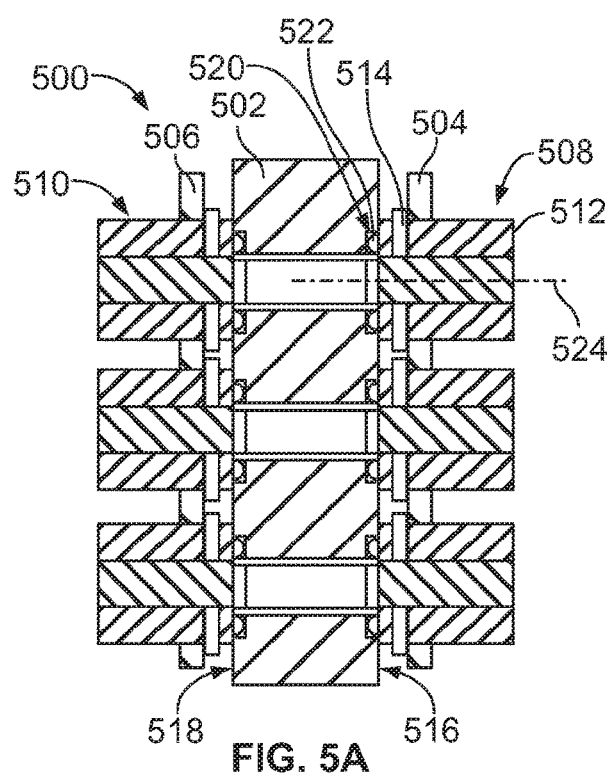
FIG. 5A illustrates a cross sectional view a multi-port connector having face seals, in accordance with an example implementation.
Figure 5B:
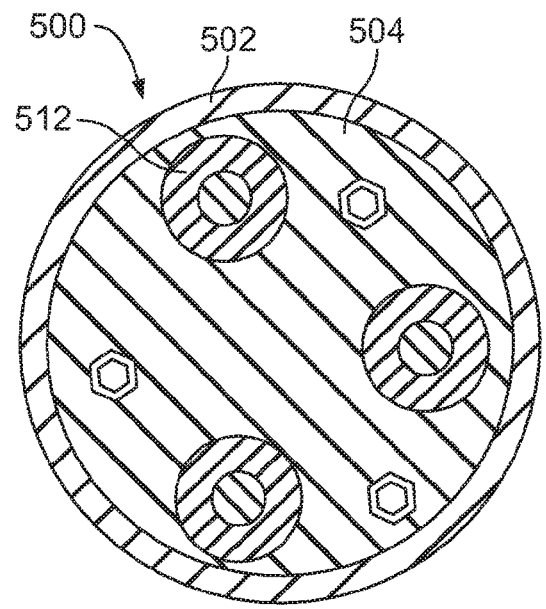
FIG. 5B illustrates a side view of the multi-port connector of FIG. 5A, in accordance with an example implementation.

FIG. 5A illustrates a cross sectional view a multi-port connector 500 having face seals, and FIG. 5B illustrates a side view of the multi-port connector 500, in accordance with an example implementation. Similar to the multi-port connector 200, the multi-port connector 500 has a block 502, a first clamp plate 504, a second clamp plate 506, a first set of fittings 508, and a second set of fittings 510.

Each fitting of the first and second sets of fittings 508, 510 may have an annular groove disposed on an exterior peripheral surface thereof, and a retaining ring may be disposed in the annular groove. For example, the fitting 512 of the first set of fittings 508 may have an annular groove in which a retaining ring 514 may be disposed.

Instead of using radial seals, the block 502 may have grooves or cavities disposed on its end faces to house face seals. For example, the block 502 may have a first end face 516 and a second end face 518 opposite the first end face 516. The first end face 516 may have a groove 520, and a face seal 522 may be disposed in the groove 520 at the interface between the fitting 512 and the first end face 516. The face seal 522 could include any type of face seal such as O-ring, E-ring, C-ring, gasket, end-face mechanical seal, floating seal, due-cone seal, toric seal, etc.

Sealing surfaces of the face seal 522 are normal to a longitudinal axis 524 of the face seal 522 and the fitting 512. The face seal 522 is configured to prevent leakage in the radial direction with respect to the longitudinal axis 524. As illustrated in FIG. 5A, the multi-port connector 500 may include a groove and a respective face seal for each fitting of the first and second sets of fittings 508, 510.

Another example variation involves the type of retaining ring. For instance, FIGS. 2B-2D illustrate retaining rings 246, 250, and 254 shown as axially-assembled stamped retaining rings having ears or lugs separated by a gap. In other example implementations, different types of retaining rings could be used.

Figure 6A:
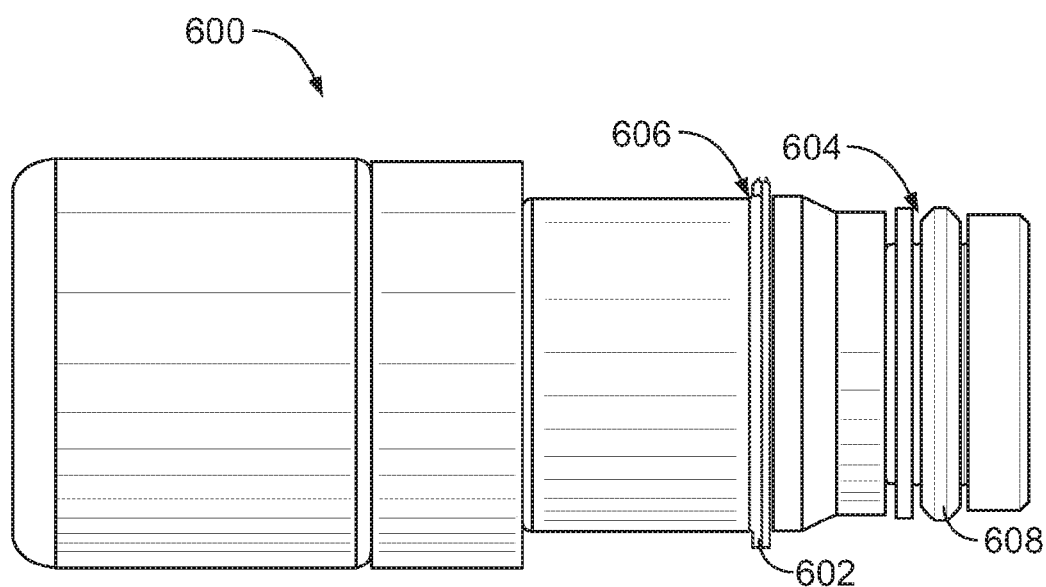
FIG. 6A illustrates a fitting having a spiral retaining ring, in accordance with an example implementation.
Figure 6B:
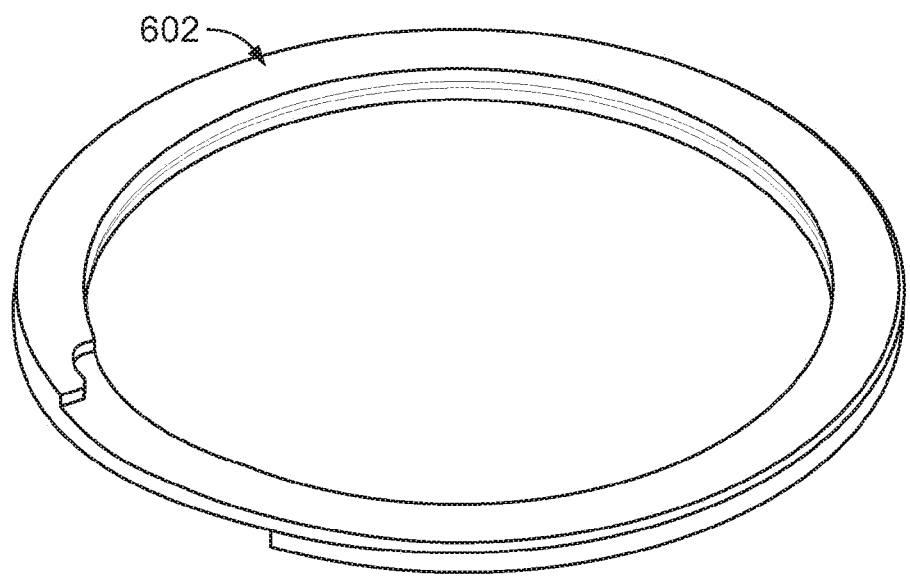
FIG. 6B illustrates a perspective view of the spiral retaining ring of FIG. 6A, in accordance with an example implementation.

FIG. 6A illustrates a fitting 600 having a spiral retaining ring 602, and FIG. 6B illustrates a perspective view of the spiral retaining ring 602, in accordance with an example implementation. The fitting 600 could represent, or could be used instead of, any of the fittings described above.

For example, similar to the fitting 238 shown in FIG. 2D, the fitting 600 may have a first annular groove 604 and a second annular groove 606 on an exterior peripheral surface of the fitting 600. A radial seal 608 may be disposed in the first annular groove 604, and the spiral retaining ring 602 may be disposed in the second annular groove 606.

In an example, when a multi-port connector similar to the multi-port connector 200 but using the fitting 600 is assembled, the spiral retaining ring 602 is disposed between a clamp plate (e.g., the clamp plate 210) and an end face (e.g., the first end face 204) of a block (e.g., the block 202). For instance, the spiral retaining ring 602 may have a first end surface directly interfacing with the clamp plate and a second end surface opposite the first end surface and interfacing directly with the block.

The spiral retaining ring 602 is configured to withstand or hold axial loads as described above with respect to the retaining rings 250 and 254. In contrast with the retaining rings 250, 254, the spiral retaining ring 602 does not have lugs or ear and does not have gaps, and spans 360°. In examples, the lack of gaps may enable the spiral retaining ring 602 to hold higher loads without deforming the material surrounding the annular groove 606 compared to the retaining rings 250, 254.

Figure 7:
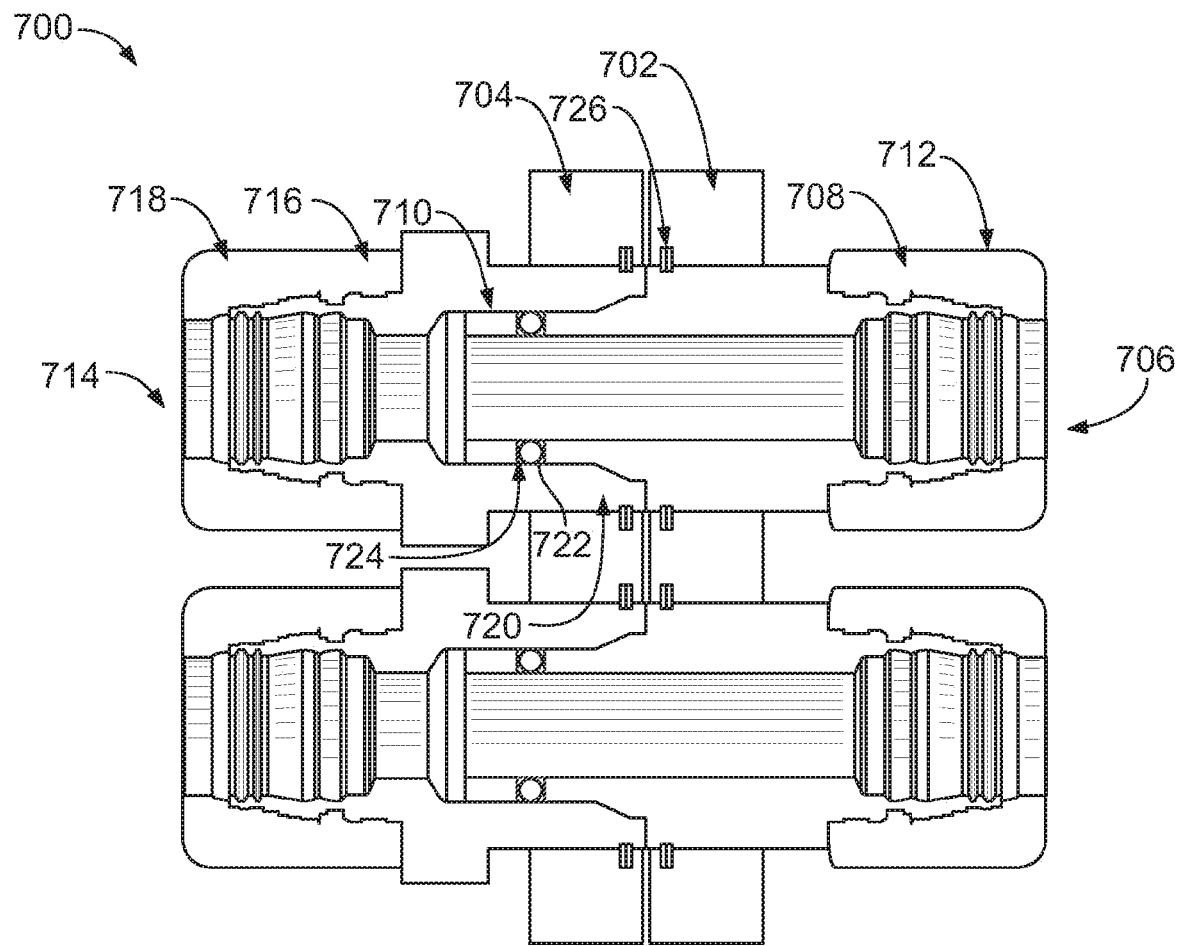
FIG. 7 illustrates another multi-port connector, in accordance with an example implementation.

In still another example implementation, the features of the block 202 may be integrated into the fittings, and therefore the block 202 may be eliminated from the multi-port connector 200. FIG. 7 illustrates a multi-port connector 700, in accordance with an example implementation. The multi-port connector 700 includes a first clamp plate 702 and a second clamp plate 704. The first clamp plate 702 has a plurality of through-holes corresponding to, and aligned with, a respective plurality of through-holes disposed in the second clamp plate 704. In examples, the plurality of through-holes of each clamp plate 702, 704 may be disposed in a radial array about a center of a respective clamp plate 702, 704.

The multi-port connector 700 also includes a first set of fittings 706, such as fitting 708, inserted through the first clamp plate 702. Each fitting of the first set of fittings 706 such as the fitting 708 has a male end portion 710 and a female end portion 712. The female end portion 712 is configured to receive a tube therein. In other configurations, however, the fitting 708 could be reversed such that the male end portion 710 is coupled to a tube rather than the female end portion 712.

The multi-port connector 700 also includes a second set of fittings 714, such as fitting 716, inserted through the second clamp plate 704. Each fitting of the second set of fittings 714 such as the fitting 716 has a first female end portion 718 and a second female end portion 720. The first female end portion 718 is configured to receive a respective tube therein, and the second female end portion 720 is configured to receive the male end portion 710 of the corresponding fitting 708 of the first set of fittings 706. Further, each through-hole of the plurality of through-holes of the first and second clamp plates 702, 704 may have respective lead-in chamfers to facilitate insertion of respective fittings of the first and second sets of fittings 706, 714.

With this configuration, the fittings of the second set of fittings 714 are not symmetric to the fittings of the first set of fittings 706. Several features of the block 202 described with respect to the multi-port connector 200 are integrated to the fittings of the second set of fittings 714. For example, the second female end portion 720 is configured to receive the male end portion 710, and thus the plurality of through-holes of the block 202 are replaced with the second female end portions 720 of the second set of fittings 714. Further, instead of coupling the clamp plates 702, 704 to a block (e.g., the block 202), the clamp plates 702, 704 could be clamped together via a plurality of fasteners.

The multi-port connector 700 also includes a plurality of radial seals disposed in an annular groove in an exterior peripheral surface of a respective male end portion of a respective fitting of the first set of fittings 706, such that each radial seal is disposed within the second female end portion 720 of a respective fitting of the second set of fittings 714 when coupled. For example, a radial seal 722 is disposed in an annular groove 724 disposed in an exterior peripheral surface of the male end portion 710 of the fitting 708, such that the radial seal 722 is disposed within the second female portion 720 of the fitting 716.

The multi-port connector 700 further includes a plurality of retaining rings, each retaining ring being disposed partially within a first annular groove in an exterior peripheral surface of a fitting of the first or second set of fittings 706, 714 and partially within a second annular groove disposed in an outer peripheral surface defining a respective through-hole in the first or second clamp plate 702, 704. For example, a retaining ring 726 is disposed partially within a first annular groove in an exterior peripheral surface of the fitting 708 of the first set of fittings 706 and partially within a second annular groove disposed in an outer peripheral surface defining a respective through-hole in the first clamp plate 702.

In examples, the retaining rings, e.g., the retaining ring 726, could be similar to the retaining ring 246 having lugs and a gap therebetween. However, in other examples, the retaining ring 726 could be similar to the spiral retaining ring 602 with no lugs or gaps.

The multi-port connector 700 may replace any of the multi-port connectors described above, and may be used with the power generating device 100 within the channels 104, 106. The multi-port connectors 700 may have a reduced overall radial size relative to the multi-port connectors 200 due to elimination of the block 202.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. An assembly comprising:
   a block having a first end face, a second end face opposite the first end face, and a plurality of through-holes extending between the first end face and the second end face;
   a first clamp plate and a second clamp plate, each clamp plate having a respective plurality of through-holes corresponding to, and aligned with, the plurality of through-holes of the block, wherein a first gap separates the first clamp plate from the block throughout a surface of the first clamp plate facing the block, and wherein a second gap separates the second clamp plate from the block throughout a respective surface of the second clamp plate facing the block;
   a first set of fittings, each fitting of the first set of fittings having a first end inserted through a respective through-hole in the first clamp plate and the first end face to be received within a corresponding through-hole in the block, wherein each fitting has a second end opposite the first end and configured to couple to a tube; and
   a second set of fittings, each fitting of the second set of fittings having a respective first end inserted through a respective through-hole in the second clamp plate and the second end face to be received within the corresponding through-hole in the block, wherein each fitting has a respective second end opposite the respective first end and configured to couple to a respective tube, wherein each fitting of the first set of fittings and the second set of fittings has (i) a first annular groove disposed in an exterior peripheral surface thereof, and (ii) and a second annular groove disposed on the exterior peripheral surface and spaced axially apart from the first annular groove, wherein the second annular groove is disposed in the first gap or the second gap, wherein a radial seal is disposed in the first annular groove within the corresponding through-hole in the block, and wherein a retaining ring is disposed in the second annular groove, such that the retaining ring is disposed in the first gap or the second gap between a respective clamp plate of the first or second clamp plate and a respective end face of the first or second end face of the block, wherein a fitting of the first set of fittings has a different axial length than a mating fitting of the second set of fittings, wherein respective first ends of the first set of fittings are coplanar with one another within the block, whereas respective second ends of the first set of fittings are offset in an axial direction such that the respective second ends are not coplanar with one another, such that adjacent fittings of the first set of fittings having different axial lengths relative to each other, wherein respective first ends of the second set of fittings are coplanar with one another within the block, whereas respective second ends of the second set of fittings are offset in the axial direction such that they are not coplanar with one another, such that adjacent fittings of the second set of fittings having different axial lengths relative to each other, thereby causing the first set of fittings and the second set of fittings to be disposed in a staggered arrangement.

2. The assembly of claim 1, wherein first ends of the first set of fittings interface with respective first ends of the second set of fittings within the corresponding through-hole in the block, such that a fitting of the first set of fittings and a mating fitting of the second set of fittings form a fluid passageway through the block.

3. The assembly of claim 1, wherein the retaining ring is a spiral retaining ring having a first surface directly interfacing with a respective clamp plate of the first or second clamp plate and a second surface opposite the first surface and interfacing directly with the block.

4. The assembly of claim 1, wherein each through-hole of the plurality of through-holes of the block has respective lead-in chamfers at the first end face and the second end face of the block to facilitate insertion of fittings of the first and second sets of fittings.

5. The assembly of claim 1, wherein the first clamp plate, the second clamp plate, and the block have a plurality of respectively aligned holes configured to receive respective fasteners that couple the first clamp plate and the second clamp plate to the block.

6. The assembly of claim 1, wherein the block is disk-shaped, and wherein the plurality of through-holes are disposed in a radial array about a center of the block.

\* \* \* \* \*